United States Patent [19]

Matsuda et al.

[11] 4,062,333
[45] Dec. 13, 1977

[54] SUPERCHARGED INTERNAL COMBUSTION ENGINE

[75] Inventors: Minoru Matsuda, Chofu; Junji Otani, Omiya; Kenzo Kaji, Ooi; Masanori Masumura, Sayama, all of Japan

[73] Assignee: Honda Giken Kogyo Kabushiki Kaisha, Tokyo, Japan

[21] Appl. No.: 669,907

[22] Filed: Mar. 24, 1976

[30] Foreign Application Priority Data

Mar. 26, 1975 Japan .................. 50-39355[U]

[51] Int. Cl.² ........................................ F02B 33/00
[52] U.S. Cl. ........................................ 123/119 C
[58] Field of Search ............... 123/119 C; 60/611

[56] References Cited
U.S. PATENT DOCUMENTS

| 1,984,013 | 12/1934 | Fast | 123/119 C |
| 2,989,840 | 6/1961 | Lieberherr | 60/611 |

FOREIGN PATENT DOCUMENTS

| 179,147 | 6/1952 | Austria | 123/119 C |
| 222,757 | 10/1924 | United Kingdom | 123/119 C |

Primary Examiner—Ronald H. Lazarus
Attorney, Agent, or Firm—Lyon & Lyon

[57] ABSTRACT

An internal combustion piston engine drives a rotary supercharger of the positive displacement substantially continuous flow type, the supercharger turning in proportion to the engine speed. A power control valve is positioned upstream from the supercharger for controlling the flow of air-fuel mixture to said supercharger. Objectionable fluctuations in speed of the engine when idling are minimized by a secondary valve operatively positioned between the supercharger and a valved intake passage leading to the combustion chamber of the engine. The operation of the secondary valve and the power control valve are coordinated so that the secondary valve remains in idle position when the engine is idling but remains in open position during all other engine operating conditions.

10 Claims, 8 Drawing Figures

SUPERCHARGED INTERNAL COMBUSTION ENGINE

This invention relates to supercharged internal combustion engines and particularly to such engines for use in ground vehicles such as motorcycles and automobiles.

Year by year, restrictive regulations become more severe on noise level and on exhaust emissions for land vehicle engines. Various kinds of solutions have been proposed to satisfy such restrictive regulations, but such proposals commonly entail a reduction in engine output performance. It is the principal object of this invention to provide a supercharged internal combustion engine which has a low noise level, low emission of unwanted air pollutants, good fuel economy, and all without reduction of engine output performance.

Engine noise in the induction passageway can be largely eliminated by employing a positive displacement, substantially continuous flow type supercharger and an air cleaner case with a large volume not required to function as a silencer and further reduce noise in the induction passageway. Furthermore, the use of a supercharger acts to homogenize the air-fuel intake mixture by improving vaporization of the fuel by the mixing effect and the temperature increase. This improved vaporization produces better fuel economy and acts to limit harmful components in the exhaust gases.

The following problem arises however, when a supercharger of the type described is employed in connection with an internal combustion engine for land vehicle use: the engine speed is unstable when idling;
This problem has been remained unsolved because supercharged internal combustion engines have been used primarily for aircraft, racing cars and motorcycles. In none of these prior uses of superchargers has the uneven idle speed been important. However, this is an important consideration when the supercharged engine is used in mass-produced automobiles and motorcycles which are operated under widely varying conditions.

When a supercharged engine of the type described is operated under load at constant speed, the quantity of air-fuel mixture inducted into the supercharger is substantially equal to that inducted into the combustion chamber during any short time interval. But when the engine is idling and its rotation speed is periodically oscillating, the flow rate of the mixture inducted into the supercharger varies substantially with respect to the engine speed, and, in turn, the flow rate of the mixture into the combustion chamber also varies, there being a time delay. This action further contributes to oscillation of the engine speed, resulting in the persistent instability of the engine at idling speed. This speed variation at idling has been found to occur in supercharged engines having the following four features:
  a. A power control valve is located upstream of the supercharger.
  b. The supercharger is of the positive displacement type.
  c. The supercharger is driven directly from the engine and at a proportional speed.
  d. A space having substantial volume exists in the intake passageway between the supercharger and the inlet valve or valves of the engine.
A detailed analysis shows that a sudden increase in the rotation speed of the engine, without change in its control valve opening, causes the mixture quantity inducted by the supercharger per engine cycle to decrease. And, as there exists a substantial volume in the intake passageway downstream from the supercharger, the engine must rotate at least for several cycles until the pressure in the intake passageway, that is to say, the mixture quantity inducted into the engine per cycle, attains the proper predetermined value. On the other hand, when a sudden decrease in engine rotation occurs, the mixture quantity inducted by the supercharger quickly increases, but the mixture quantity inducted into the engine increases gradually.

Thus, when the engine speed changes, even though the throttle valve is fixed in open position, the pressure oscillation in the intake passageway downstream of the supercharger later follows the pressure oscillation upstream of the supercharger, with the result that the quantity of mixture delivered to the combustion chamber changes cyclically with a time delay in accordance with and following the varying quantity inducted by the supercharger. This time delay promotes instability of the engine idling speed.

In accordance with this invention, a secondary valve is placed in the intake passageway downstream from the supercharger and comparatively near the intake valve or valves of the engine. Means are provided to coordinate the operation of the throttle valve and the secondary valve in order to achieve the following operating characteristics:
  a. When the throttle valve is in its idle position, the secondary valve is also in its idle position.
  b. The secondary valve remains at its fully open position, except when the throttle valve is at its idle position.
  c. The secondary valve opens gradually from the idle position to the fully open position.
  d. When the throttle valve is opened rapidly, the secondary valve is also opened rapidly to the degree corresponding to that of the throttle valve.

Important advantages follow from these operating characteristics. Since the secondary valve is at the idle position when the engine is idling, the pressure oscillation in the intake passageway near the inlet valve is restrained, and this stabilizes the engine idling speed by maintaining the mixture quality inducted into the engine at a substantially constant value.

Also, since the secondary valve is fully open except when the engine is idling, the secondary valve does not restrict the mixture flow at all, thereby preserving efficient operation of the engine. In addition, since the secondary valve opens gradually from its idle position to fully open position, the power shock of sudden increase of traction force caused by rapid opening is prevented. Moreover, as the secondary valve opens quickly to the predetermined position in following the action of the throttle valve, the secondary valve does not resist the mixture flow, and accordingly the effective acceleration performance of the engine is maintained.

Other objects and advantages will appear hereinafter.

In the drawings:

FIGS. 1–4 show the essential features of this invention in diagrammatic form.

FIGS. 1–3 are side elevations partly in section.

Referring to the drawings, the internal combustion engine 1 has a cylinder block 2, a cylinder head 3, and a reciprocating piston 4. An intake valve 5 and an exhaust valve 6 are operated mechanically by conventional means, not shown. The combustion chamber 7 is defined between the piston 4 and the cylinder head 3, and there is provided an intake passage 8 and an exhaust passage 9.

The intake passage 8 receives an air-fuel mixture from the reservoir 11 which, in turn, receives the mixture from the screw type supercharger 12. The power control valve, or throttle valve, 13 is positioned upstream from the supercharger 12 and controls the flow of mixture through the carburetor 14. Atmospheric air is supplied to the carburetor 14 through the air cleaner 15.

The supercharger 12 is driven by means of the belt 16 from the engine crank shaft 10. The secondary valve 17 is connected to the vacuum apparatus 18 by means of the lever 19 and the arm 20 to which it is pivotally attached. The suction terminal 21 projecting from the vacuum chamber Y communicates with the three-way switching valve 24 through the projecting terminal 66. The three-way switching valve 24 communicates with the port 22 in the intake passage downstream from the power control valve 13 and it also communicates with the atmospheric port 23 in the air cleaner 15. As explained below, the switching valve 24 establishes communication between the suction terminal 21 and the port 22 when the engine is idling, and it establishes communication between the suction terminal 21 and the atmospheric port 23 when the engine is operating in any condition other than idling.

To lubricate the supercharger 12, the oil supply at inlet port 27 is connected to the pressurized oil line 26 of the engine from the oil pump 25 and the oil reservoir 28 to the engine oil pan.

The secondary valve 17 in the intake passage 8 is fixed on the shaft 29 which is mounted to turn in the intake passage 8. The shaft 29 has a lever 19 fixed at one end thereof by means of the nut 31 and the washer 30. The vacuum apparatus 18 includes an upper case 32, a lower case 33, a diaphragm 34 clamped between them on its periphery, and rod 20 having one end thereof fastened to the central part of the diaphragm 34 by means of the plates 35 and 36. A coil compression spring 37 is mounted within the recess 38 of the lower case 33, and the force of the spring acts to move the diaphragm 34 in a direction to project the rod 20. A bracket 39 secured to the upper case 32 supports the vacuum apparatus 18. The vacuum apparatus 18 is divided in two chambers X and Y by the diaphragm 34. The lever 19 is pivotally connected to the arm 20 by means of the pin 40.

The lever 41 is mounted to turn on the shaft 29 at a location between the position of the lever 19 and the flange 29a formed on the shaft 29. The lever 41 has a laterally projecting part 43 which is positioned to be contacted by the adjusting bolt 44 carried on the lever 19. The lever 41 also has a stopper portion positioned to contact the stationary pin 46. A torsion spring 45 engages the stationary pin 46 at one end and engages a portion of the lever 41 at the other end. The lever 41 has a stopper portion 41a which engages the stationary pin 46 to define the idling position of the secondary valve 17.

The switching valve 24 comprises a cylindrical housing 47 having four concentric bores 48, 49, 50 and 51. A slide valve 52 in the recess defined by the bore 48 comprises a valve body 53 having axially extending fins which define flow spaces 54 between them. A conical shaped rubber seat 55 is fixed to the valve body 53, and a sliding pin 56 is mounted within the cylindrical bore 57 with its lower tip always in contact with the threaded adjusting plug 59. A coil spring 58 within the bore 57 acts to urge the valve body away from the plug 59. The sliding valve rod 60 contacts the rubber seat 55 and projects through the threaded plug 61. It is provided with a sealing rubber ring 62 between the integral flanges 63 and 64. A conical spring 65 urges the sliding valve rod 60 to move in a direction away from the valve body 53. Port 66, which is in communication with the vacuum chamber Y of the vacuum apparatus 18, communicates with the bore 51. Port 67, which communicates with the intake passage 22 downstream of the power control valve 13, communicates with the bore 48. Port 68, which communicates with atmosphere in the air cleaner 15 through orifice 69, is in communication with the bore 49.

The power control valve 13 is fixed on the shaft 70 which rotates in the intake passage between the carburetor 14 and the supercharger 12. The control lever 71 is fixed to the projecting end of the shaft 70 by means of the nut 73 and the washer 72. An adjusting bolt 74 carried by the control lever 71 always contacts the projecting end of the sliding valve rod 60. A tension spring 75 acts on the control lever 71 to move it in a direction to close the power control valve 13. The power control valve 13 is manually operated through cable 81 from an accelerator pedal 80. The lever 41 for the secondary valve 17 is controlled through the cable 82 which is also operated by the accelerator pedal 80.

Check valve 83 is provided for the reservoir 11 in order to induct air into the intake passage 8 whenever the pressure falls below a predetermined value. This check valve 83 comprises a lower case 84 screw-mounted to the reservoir and having a sealing ring 88. The upper case 85 is fixed to the lower case 84 and is adapted to be contacted by a resilient sealing valve 86 carried by the coil compression spring 87. The sealing valve 86 closes the port 89 which communicates with the atmosphere in the air cleaner 15 through the pipe S. As negative pressure in the intake passage 8 increases rapidly when the vehicle is decelerating, liquid fuel adhering to the walls of the intake passage is inducted into the combustion chamber and forms a very rich air-fuel mixture, resulting in misfire. The check valve 83 prevents this misfire by diluting the rich mixture with atmospheric air.

Figure 1:
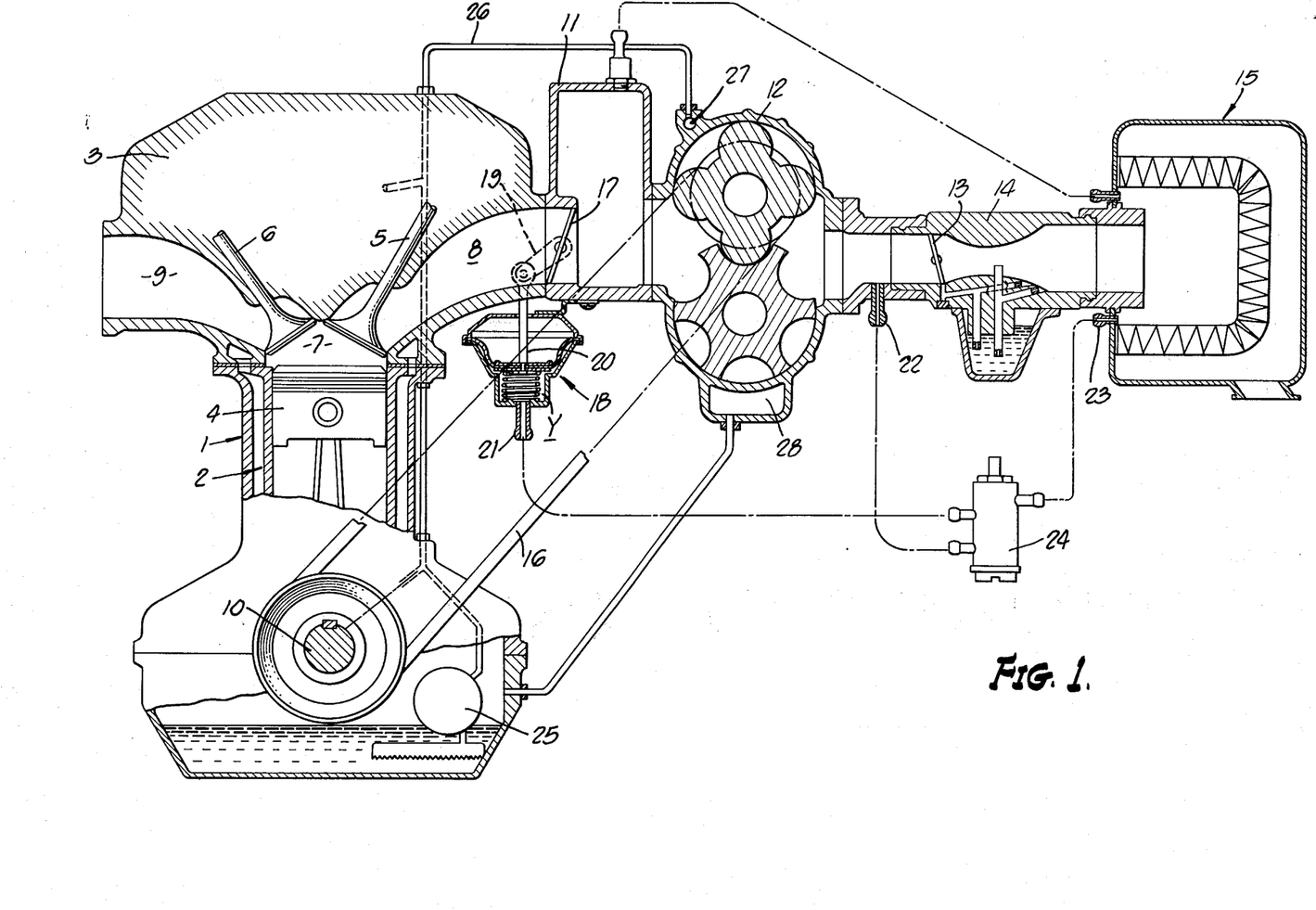
Figures 2, 3:
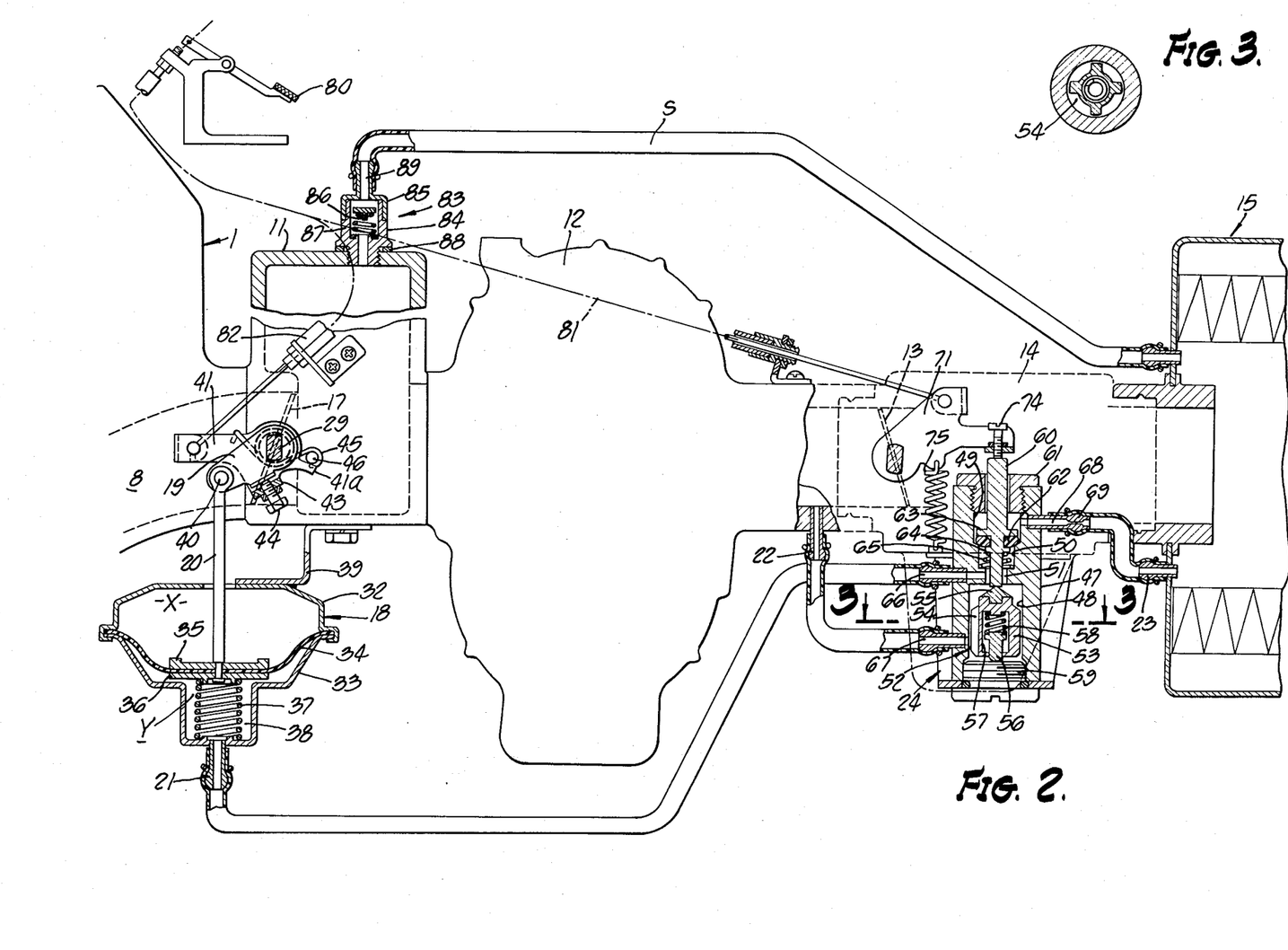
Figure 4:
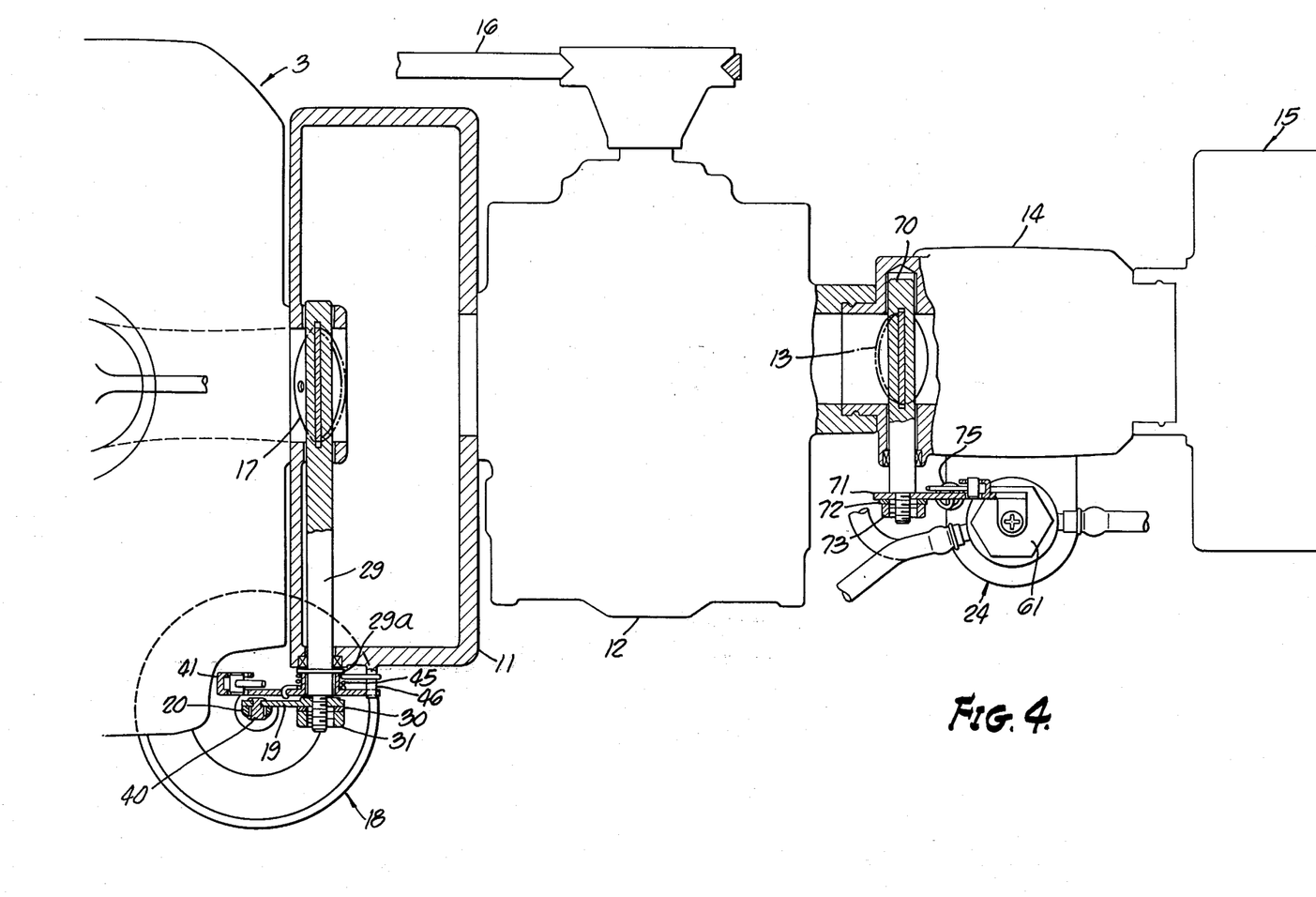
FIG. 4 is a plan view partly in section.

In the operation of the device shown in diagrammatic form in FIGS. 1-4 of the drawings, the engine idles when the power control valve 13 and the secondary valve 17 are both in the idle position, as shown in FIG. 2. In this position of the parts, the control lever 71 pushes on the rod valve 60 of the switching valve 24, so that the switching valve establishes communication only between the port 66 and the port 67. In effect, this connects the vacuum chamber Y with the port 22 in the intake passage 8 between the carburetor 14 and the supercharger 12. The comparatively large negative pressure acts on the diaphragm 13 to retract the rod 20 to hold the secondary valve 17 in idling position.

When the engine is rotating with the power control valve 13 opened to a certain degree, the lever 71 is moved away from the end of the rod valve 60, and the spring 65 moves the rod valve 60 to establish communication between the port 66 with the port 68 and to shut off communication between the port 66 and the port 67. Accordingly, there is a pressure increase in the vacuum chamber Y, which gradually rises as a result of flow of air through the orifice 69. The diaphragm 34 and the rod 20 move slowly, resulting in slow opening of the secondary valve 17 to its full open position.

In case of quick opening of the power control valve 13, such as occurs when the motor vehicle is to be accelerated, the secondary valve 17 should be quickly opened, corresponding to the opening angle of the power control valve, so as to prevent less efficient operation of the engine. Accordingly, when the power control valve 13 is opened quickly, when the control lever 71 is out of contact with the rod valve 60, the lever 41 is also simultaneously rotated corresponding to the degree of opening of the throttle control valve 13, resulting in causing the secondary valve 17 to open by means of the contact between the levers 19 and 41 through the adjusting bolt 44.

Figure 5:
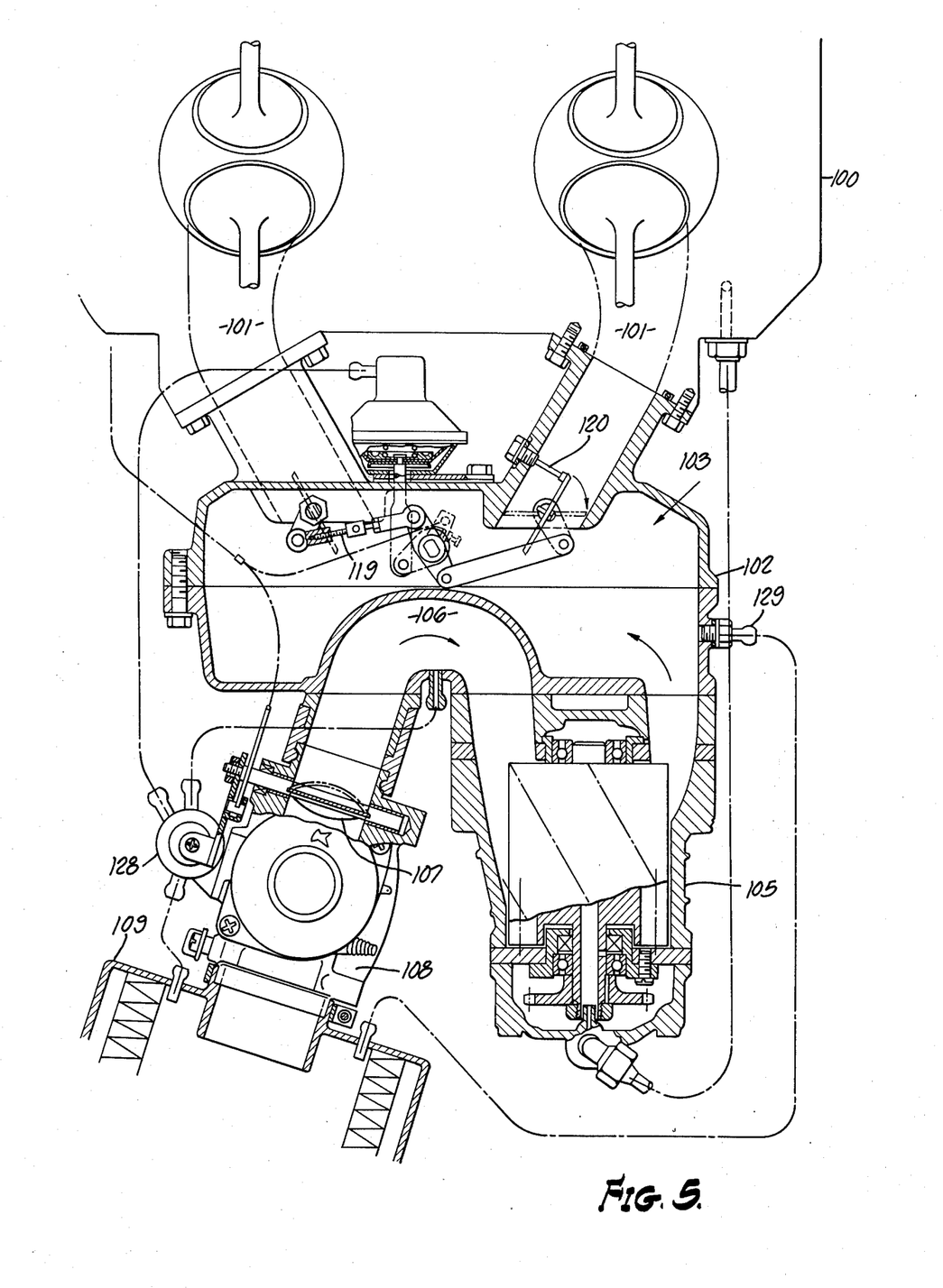
FIG. 5 is a sectional side elevation showing a preferred embodiment of this invention.
Figure 6:
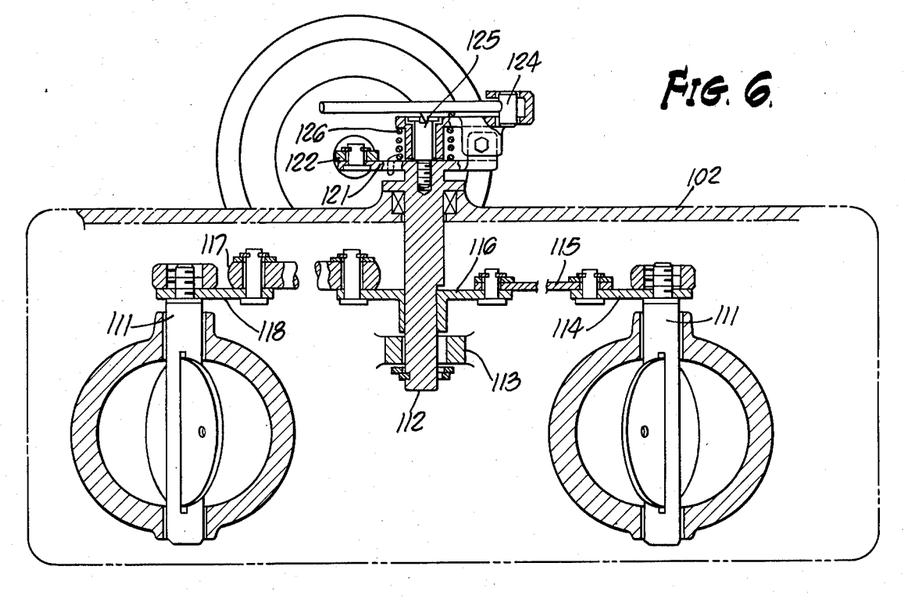
FIG. 6 is a sectional detail taken substantially on the lines 6—6 as shown in FIG. 5.
Figure 7:
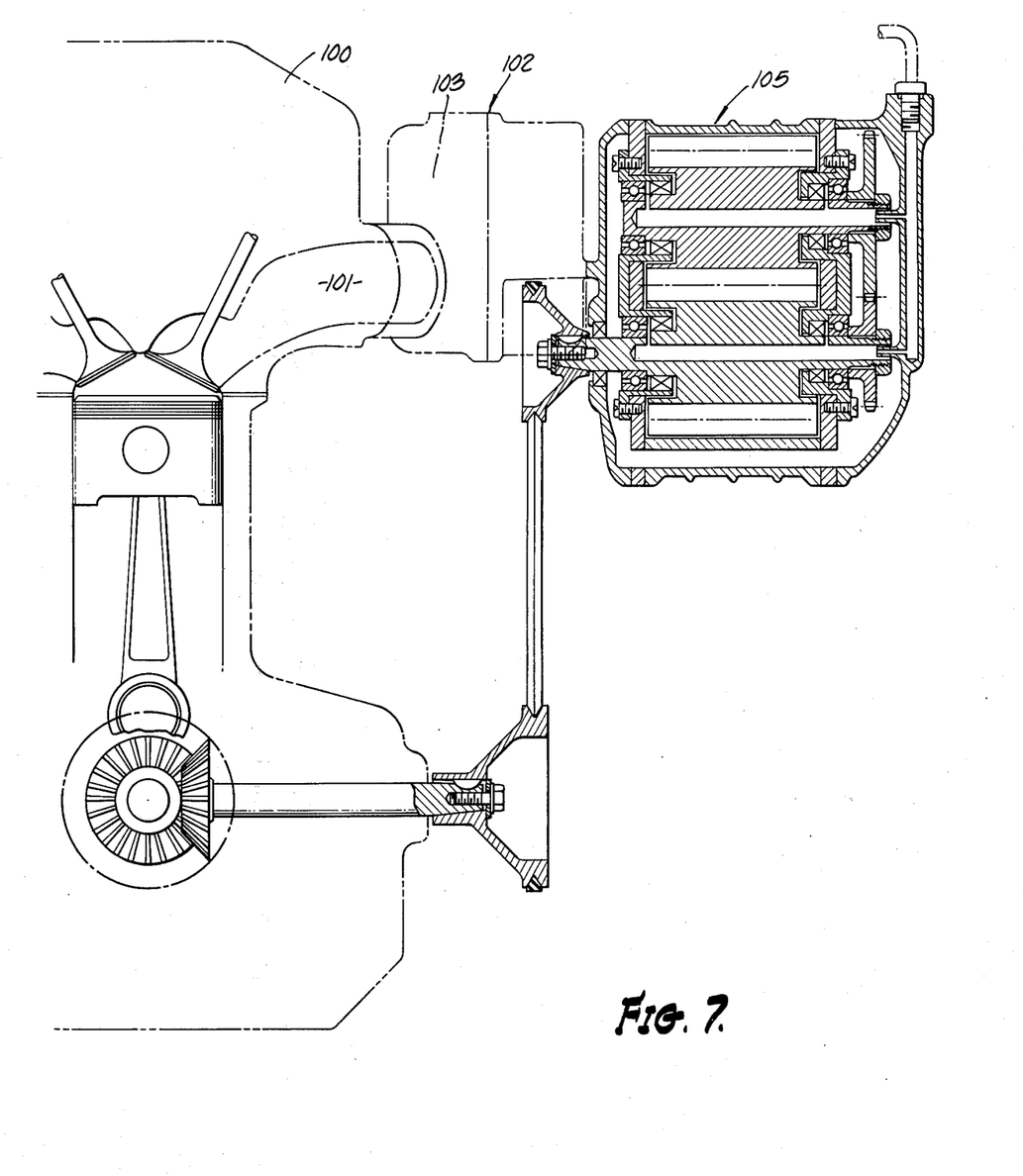
FIG. 7 shows how the supercharger is driven from the engine crankshaft.

FIGS. 5, 6, 7 show the configuration of the parts which comprise the preferred embodiment of this invention. The construction and operation are similar in principle to that described above in connection with FIGS. 1–4 but the physical arrangement of the parts is different in some respects. The internal combustion engine 100 is a conventional four-cycle engine having two cylinders. Two intake passages 101 are provided, and both are connected to the space 103 within the reservoir 102. The screw-type supercharger generally designated 105 is directly attached to the reservoir case 102, power control valve 107, carburetor 108 and air cleaner 109. The major intake passage 106 connecting the power control valve 107 to the inlet of the supercharger 105 is cast integrally with the lower half of the reservoir case 102. Each of the secondary valves 110 is mounted near the inlet of its respective intake passage 101, and each is fixed on its respective shaft 111, the shaft being mounted to turn. The control shaft 112 is mounted to turn on the upper portion of the reservoir case 102 and is positioned parallel to both shafts 111 and substantially midway therebetween. One end of the control shaft 112 is guided in an opening in the stationary member 113. A lever 116 is fixed on the control shaft 112 and has oppositely projecting arms pivotally connected to levers 114 and 118. The link 115 connects one arm of the lever 116 to the lever 114, and the adjustable link 117 connects the other arm of the lever 116 to the lever 118. The screw-threaded member 119 provides a length adjustment for the link 117.

The full open position of one secondary valve 110 is determined by the stopper 120, and the full open position of the other secondary valve 110 is determined by adjusting the length of the link 117.

The projecting end of the control shaft 112 has an integral arm 121 pivotally connected to the rod 122 of the vacuum apparatus 123. The lever 124 is mounted to turn with respect to the projecting end of the control shaft 112. The lever 124 carries an adjusting bolt 127 which contacts a shoulder on the arm 121. A torsion spring 126 is operatively positioned between the lever 124 and the arm 121. The switching valve is shown at 128, and the check valve is shown at 129. The other parts of this preferred form of the invention are similar to those previously described.

FIG. 7 shows how one of the rotors of the supercharger 105 is driven directly from the engine crankshaft, and is gear-connected to the other rotor.

Figure 8:
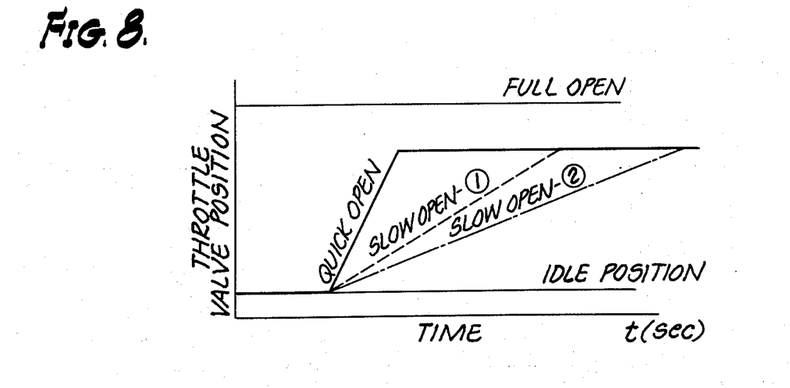
FIG. 8 is a graph comparing opening positions of the throttle valve and secondary valve, as compared to elapsed time.

The graphs of FIG. 8 show how the secondary valve moves in accordance with operation of the power control valve (throttle valve). When the throttle valve is opened quickly, as shown by the full line, the secondary valve also opens quickly, but only to the extent of the opening of the throttle valve. When the throttle valve is opened more slowly, as shown by the dashed line, the secondary valve follows in accordance with its dashed line and continues to a full opened position. When the throttle valve is opened still more slowly, as shown by the dot and dash line, the secondary valve moves to fully opened position, as shown by its dot and dash line.

Having fully described our invention, it is to be understood that we are not to be limited to the details herein set forth but that our invention is of the full scope of the appended claims.

We claim:

1. Supercharger apparatus for use with an internal combustion piston engine having a valved intake passage communicating with a combustion chamber, comprising, in combination: a rotary supercharger of the positive displacement substantially continuous flow type, mechanical means for driving the supercharger from the engine to rotate substantially in proportion to the engine speed, a power control valve positioned upstream from said supercharger for controlling the flow of air-fuel mixture to said supercharger, a secondary valve operatively positioned between the supercharger and said valved intake passage of the engine, means coordinating the operation of said secondary valve and said power control valve so that the secondary valve remains in idle position when the engine is idling but remains in open position during all other engine operating conditions, said coordinating means including a vacuum device for operating said secondary valve, and means for connecting the vacuum device to an intake passage upstream from said supercharger.

2. Supercharger apparatus for use with an internal combustion piston engine having a valve intake passage communicating with a combustion chamber, comprising, in combination: a rotary supercharger of the positive displacement substantially continuous flow type, mechanical means for driving the supercharger from the engine to rotate substantially in proportion to the engine speed, a power control valve positioned upstream from said supercharger for controlling the flow of air-fuel mixture to said supercharger, a secondary valve operatively positioned between the supercharger and said valved intake passage of the engine, means coordinating the operation of said secondary valve and said power control valve so that the secondary valve remains in idle position when the engine is idling but remains in open position during all other engine operating conditions, said coordinating means including a vacuum device for operating said secondary valve, and means including a three-way valve for connecting the vacuum device to atmosphere or to an intake passage upstream from said supercharger.

3. Supercharger apparatus for use with an internal combustion engine having a valved intake passage communicating with a combustion chamber, comprising, in combination: a rotary supercharger of the positive displacement substantially continuous flow type, mechanical means for driving the supercharger from the engine to rotate substantially in proportion to the engine speed, a power control valve positioned upstream from said supercharger for controlling the flow of air-fuel mixture to said supercharger, a reservoir positioned between the supercharger and the engine, a secondary valve operatively positioned between the reservoir and said valved intake passage of the engine, means coordinating the operation of said secondary valve and said power control valve so that the secondary valve moves to idle position when the engine is idling but remains open at all other times, said coordinating means including a vacuum device, linkage means within said reservoir connecting the vacuum device to operate said secondary valve, and means for connecting the vauum device to an intake passage upstream from said supercharger.

4. Supercharger apparatus for use with a two-cylinder internal combustion engine having a valved intake passage communicating with each combustion chamber, respectively, comprising, in combination: a rotary supercharger of the positive displacement substantially continuous flow type, mechanical means for driving the supercharger from the engine to rotate substantially in proportion to the engine speed, a power control valve positioned upstream from said supercharger for controlling the flow of air-fuel mixture to said supercharger, a reservoir positioned between the supercharger and the engine, a pair of secondary valves, each operatively positioned between the reservoir and one of said valved intake passages, respectively, means coordinating the operation of said secondary valves and said power control valve so that the secondary valves move to an idle position when the engine is idling but remain open at all other times, said coordinating means including a vacuum device, and linkage means positioned within said reservoir connecting said vacuum device with said secondary valves.

5. The combination set forth in claim 4 in which the linkage means includes a pair of links operated from a common lever, and means for adjusting the length of one of said links.

6. The combination set forth in claim 1 in which the coordinating means includes means gradually opening the secondary valve from idle position to open position.

7. The combination set forth in claim 6 in which the coordinating means also includes means for quickly opening the secondary valve from idle position to a position responsive to the power control valve.

8. The combination set forth in claim 2 in which the three-way valve includes a restricted passageway in said connecting line between the vacuum device and atmosphere.

9. The combination set forth in claim 1 in which a reservoir is positioned between the supercharger and the engine, and a secondary valve is operatively positioned between the reservoir and said valved intake passage of the engine.

10. The combination set forth in claim 9 in which valve means are provided to admit atmospheric air into said reservoir when the pressure therein falls below a predetermined value.

* * * * *